United States Patent
Vallance et al.

(10) Patent No.: US 8,304,110 B2
(45) Date of Patent: Nov. 6, 2012

(54) COMPOSITION AND ENERGY STORAGE DEVICE

(75) Inventors: Michael Alan Vallance, Loudonville, NY (US); David Bogdan, Scotia, NY (US); Hari Nadathur Seshadri, Bangalore (IN); Karthick Vilapakkam Gourishankar, Bangalore (IN); Guruprasad Sundararajan, Bangalore (IN); Charles Dominic Iacovangelo, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 914 days.

(21) Appl. No.: 12/330,714

(22) Filed: Dec. 9, 2008

(65) Prior Publication Data

US 2010/0062334 A1    Mar. 11, 2010

Related U.S. Application Data (60) Provisional application No. 61/095,380, filed on Sep. 9, 2008.

(51) Int. Cl.
 *H01M 4/02* (2006.01)
 *H01M 4/13* (2010.01)
 *H01M 4/42* (2006.01)

(52) U.S. Cl. .......... 429/209; 429/220; 429/229

(58) Field of Classification Search .......... 429/209, 429/220, 229

See application file for complete search history.

(56) References Cited

U.S. PATENT DOCUMENTS 4,714,665 A * 12/1987 Siegel et al. .......... 429/307

FOREIGN PATENT DOCUMENTS

JP    56096464    8/1981

OTHER PUBLICATIONS

G Rog, S Kozinski, A Kozlowska-Rog; Solid oxide galvanic cells involving exchanged beta-alumina electrolyte; Electrochimica Acta, 1981; vol. 26, No. 12, pp. 1819-1821.

P. T. Moseley, R. J. Bones, D. A. Teagle, B. A. Bellamy, and R. W. M. Hawes; Stability of Beta Alumina Electrolyte in Sodium/FeCl2 (Zebra); J. Electrochem. Soc., vol. 136, No. 5, May 1989 9 The Electrochemical Society, Inc.

Preethy Parthasarathy, Neill Weber, Anil V. Virkar; High Temperature Sodium—Zinc Chloridebatteries With Sodium Beta—Alumina Solid Electrolyte; 211th ECS Meeting, Abstract #323, © The Electrochemical Society; Funded by US Department of Energy, Contract Number: DE-PS26-05NT42470-1A.

Greg Tao; V.9 A High Temperature (400 to 650° C.) Secondary Storage Battery Based on Liquid Sodium and Potassium Anodes; V. Advanced Research; (4 Pages); Office of Fossil Energy Fuel Cell Program; FY 2006 Annual Report.

* cited by examiner

*Primary Examiner* — Joseph Kosack
(74) *Attorney, Agent, or Firm* — Richard A. Decristofaro (57) ABSTRACT

A composition includes a cathodic material comprising a support structure. The support structure includes copper and zinc, and has less than 1 weight percent of aluminum, tin, or aluminum and tin. An energy storage device includes a cathodic material having a support structure.

17 Claims, 3 Drawing Sheets

COMPOSITION AND ENERGY STORAGE DEVICE

CROSS REFERENCE TO RELATED APPLICATIONS

This application claims the priority and benefit of U.S. Provisional Application No. 61/095,380 entitled "COMPOSITION, ENERGY STORAGE DEVICE AND METHOD" filed on Sep. 9, 2008, which is incorporated herein by reference in its entirety.

BACKGROUND

1. Technical Field

The invention includes embodiments that relate to a composition for use as a cathode material in an energy storage device. The invention includes embodiments that relate to the energy storage device.

2. Discussion of Art

Work has been done on rechargeable batteries using sodium as the negative electrode in a battery cell. Sodium has a standard reduction potential of −2.71 volts. Sodium is relatively low weight, non-toxic, abundant, and economically desirable in the form of sodium chloride. The sodium anode may be used in liquid form, and the melting point of sodium is 98 degrees Celsius. An ion conducting solid electrolyte (separator) separates the liquid sodium anode from a positive electrode (cathode).

A second, molten electrolyte transports ions to and from the separator on the cathode side. The melting point of the molten electrolyte, along with the temperature-dependent, sodium-ion conductivity of the solid electrolyte, determines the minimum operating temperature of the battery. The cathode should include a material that is soluble in the molten electrolyte and is compatibility with the solid electrolyte in the charged (oxidized) state. Low solubility of the oxidized cathode material in the molten electrolyte can lead to passivation of the remaining uncharged (reduced) electrode surface and fouling of the pores.

It may be desirable to have an electrochemical cell that has different chemistry than those electrochemical cells that are currently available. It may be desirable to have an energy storage device that differs from those devices that are currently available.

BRIEF DESCRIPTION

In accordance with an embodiment of the invention, a composition is provided that includes a cathodic material comprising a support structure. The support structure includes copper and zinc, and has less than 1 weight percent of aluminum, tin, or aluminum and tin.

In one embodiment, a composition includes a cathodic material. The cathodic material is a reaction product of a brass support structure and zinc.

In one embodiment, an energy storage device includes a cathodic material having a support structure. The support structure includes copper and zinc, and has less than 1 weight percent of aluminum, tin, or aluminum and tin.

DETAILED DESCRIPTION

The invention includes embodiments that relate to a composition for use as a cathodic material in an electrochemical cell in an energy storage device. The invention includes embodiments that relate to the energy storage device and associated methods of making and using the composition and device.

As used herein, a cathode supplies or receives electrons during charge/discharge of a battery. The cathode includes cathodic materials having differing functions: an electrode material and a support structure. The electrode material is present in the cathode as a participating electrochemical reactant both in its oxidized or reduced state, or at some state between full oxidation or reduction. The support structure does not undergo much if any chemical reaction during the charge/discharge, but does support the electrode material as the electrode material undergoes chemical reaction and allows for a surface upon which solids may precipitate as needed. An electrolyte is a medium that provides the ion transport mechanism between the positive and negative electrodes of a cell, and may act as a solvent for the oxidized form of the electrode material. Additives that facilitate the ion transport mechanism, but do not themselves provide the mechanism, are distinguished from the electrolyte itself.

In accordance with an embodiment of the invention, brass may be used as a material for a support structure for an energy storage device that includes a zinc electrode. The zinc functions as a working, active electrode material in the electrochemical cell. Zinc and brass may account for about 15 v/o of a cathode at 100 percent depth of discharge (DoD), and brass may account for about 9 v/o at 0 percent DoD, in one embodiment.

Brass is commercially available in a wide variety of compositions including zinc and copper. Small amounts of other metals, such as aluminum or tin, may be present in differing degrees based on the type and purity of brass obtained. One suitable brass material may include a milled (−325 mesh) brass powder that has from about 27 weight percent to about 29 weight percent zinc, from about 0.7 weight percent to about 0.9 weight percent aluminum, and the remainder copper. In one embodiment, substantially all of the zinc in a cathodic material is alloyed with the copper to form brass. In one embodiment, the cathodic material includes copper and zinc, and has less than 1 weight percent of aluminum, tin, or aluminum and tin. In one embodiment, the amount of aluminum or tin, or the combined amount of aluminum and tin, is in a range of from about 0.01 percent to about 0.1 percent based on the weight of the combination of copper and zinc. In one embodiment, the amount of aluminum, tin, or both is zero.

The brass can be alpha brass and/or gamma brass. With regard to the brass support structure, the brass includes a layer of gamma brass at a surface of the support structure. The layer of gamma-brass may have a thickness that is less than about 10 micrometer. In one embodiment, the thickness of the layer is in a range of from about 1 micrometer to about 2 micrometer, from about 2 micrometer to about 4 micrometer, from about 4 micrometer to about 6 micrometer, from about 6 micrometer to about 8 micrometer, from about 8 micrometer to about 10 micrometer. In one embodiment, the thickness of the layer is less than about 1 micrometer.

In one embodiment, the cathodic material includes the support structure and the electrode material. The electrode material can be secured to an outer surface of the support structure. The support structure can have a high surface area. The electrode material on the support structure may be adjacent to the first surface of a separator and extend away from that separator surface. The support structure can extend away from the first surface to a thickness that is greater than about 0.01 millimeters. In one embodiment, the thickness is in a range of from about 0.01 millimeters to about 0.1 millimeter, from about 0.1 millimeters to about 1 millimeter, from about 1 millimeter to about 5 millimeters, from about 5 millimeters to about 10 millimeters, from about 10 millimeters to about 15 millimeters, from about 15 millimeters to about 20 millimeters. For larger capacity electrochemical cell, the thickness may be larger than 20 millimeters.

Anchoring the electrode material to a support structure surface, rather than filling the cathode chamber with only a liquid melt, can control molten salt homogeneity. That is, the placement of the electrode material on the support structure allows for the ability to locate specific materials within the electrochemical cell. In one example, pooling of molten electrolyte compounds at the bottom of a cathodic chamber can be avoided. Or, for example, a concentration of a first electrode material in elemental form may differ from a point nearer the separator relative to a point further from the separator. Like an onion, there can be layers of the electrode material present in different concentrations or amounts depending on where located inside the electrochemical cell. Similarly, a gradient can be formed to address, for example, electrical resistivity rise or to provide a more constant availability of reactant as the reaction front area changes as it is used and advances into the cell body away from the separator surface. A gradient, as used herein, can include a concentration step change, and as such can be configured to function as a state of charge indicator.

The support structure, in an electrochemical reaction, may not be oxidized by the electrochemical reaction at a determined maximum cell potential that is less than the copper oxidation potential but greater than the zinc oxidation potential. As noted, however, due to the galvanic protection of the copper by the zinc, it may be possible to run the cell at a potential higher than the oxidation potential of the copper and still not oxidize the copper. Further, if the zinc is present in sufficient quantities, the zinc may maintain the copper in a non-ionic form or a metallic form. In other words, the copper may be precluded from forming the ionic species, or the zinc may reduce or prevent migration of copper into the separator.

Copper itself has an oxidation potential of 2.6 volts versus sodium in the present case, where the electrolyte is 400 degrees Celsius sodium tetrachloroaluminate saturated with sodium chloride. Copper ions are significantly soluble in the molten salt, and if not addressed can exchange into a sodium β"-alumina separator, which can lead to a decrease in conductivity and to catastrophic fracture. Provided there is zinc left in the cell, either as metallic zinc or as part of the brass alloy, zinc reduces mobile copper ions back to metallic copper and reduces or eliminates copper migration into the separator via ion exchange. The zinc may act as a sacrificial anode relative to the copper. This may enable cell operation up to voltages above the copper oxidation potential, without the expected oxidation of copper.

At least one of the zinc or the copper may be in the form of powder, fiber, foam, or foil. Naturally, the smaller the particles the more active surface area is available for reaction. The initial form of the reactants may not be retained whence charge/discharge cycling is complete. That is, a cell packed initially with powder may change to porous foam after the first use. The foam may be an open cell or reticulated type.

The pores may be present as mono-modal or as multi-modal average pore size distributions. In a mono-modal distribution, one mode may have an average pore size of less than about 150 micrometers, and in one embodiment the average pore size is about 100 micrometers. In a bi-modal distribution, the first mode may have an average pore size in a range of from about 90 micrometers to about 125 micrometers; and, the second mode may have an average pore size in a range of from about 5 micrometers to about 20 micrometers. For example, a suitable bi-modal distribution may include 100 micrometer pores and 10 micrometer pores. The 10 micrometer pores may be formed from electrochemical etching after the initial pores are formed. Such electrochemically etched pores may constitute about 10 percent of the total pore volume. Pore size is measured as the widest spacing along a length of a porous opening.

A cell that includes the cathodic material has an initial state prior to its first use or charge/discharge, and a subsequent state that represents the cathodic material after the first use or charge/discharge. The distinction is notable for several reasons. One reason is that the cell can be loaded with unalloyed zinc and copper, which then form a brass alloy during the first use or charge/discharge. Or, the cell can be loaded with brass initially, or can be loaded with some combination of zinc, copper and brass. As noted elsewhere herein, the initial loading can be in the form of powder, granules/grains, shavings, wire, foil or other physical configuration. In the subsequent state, the brass is generally a porous foam regardless of the physical configuration in the initial state. Granulation of brass particles added to the cell can influence or control the foam properties, and pore formers can be added to further control the foam porosity and pore configurations.

Further, the distribution of ingredients need not be homogeneous in either of the initial or the subsequent state. A separator and current collector, discussed further hereinbelow, make reasonable reference points for a discussion of metal concentrations. In one embodiment, in the subsequent state, the cathodic material is zinc rich proximate the separator and is copper rich proximate the current collector. The ratio of zinc to copper can change over the distance from the separator to the current collector in a manner that is linear or non-linear. In a non-linear instance, the ratio change is semi-exponential. During operation then, the reaction of zinc at the first location can occur prior to reacting the zinc at the second location during the at least one charge/discharge cycle.

As noted above, the brass can be added to the cell in the initial state. That brass can be alpha brass. And, the zinc can be disposed in the energy storage device in a manner that facilitates participation of the zinc in a chemical reaction with the alpha brass to form the gamma brass in the subsequent state. The gamma brass can form a layer on the support structure with alpha brass encased therein. The support structure can thus include only alpha brass in the initial state, and can include both alpha brass and gamma brass in the subsequent state. In one embodiment, in the initial state the alpha brass is free of aluminum, tin, or both aluminum and tin.

In accordance with an embodiment of the invention, an energy storage device is provided. The device includes a housing having an interior surface defining a volume. A separator is disposed in the volume. The separator has a first surface that defines at least a portion of a cathode chamber, and a second surface that defines an anode chamber, and the cathode chamber is in ionic communication with the anode chamber through the separator.

The housing can be sized and shaped to have a cross-sectional profile that is square, polygonal, or circular; and can have a width to length ratio that is greater than about 1:10. In one embodiment, the length to width ratio is in a range of from about 1:10 to about 1:5, from about 1:5 to about 1:1, from about 1:1 to about 5:1, from about 5:1 to about 10:1, from about 10:1 to about 15:1. The housing can be formed from a material that is a metal, ceramic, or a composite; the metal can be selected from nickel or steel, the ceramic can be a metal oxide.

The ionic material transported across the separator between the anode chamber and the cathode chamber can be an alkali metal. Suitable ionic material may include one or more of sodium, lithium and potassium. The anodic material is molten during use. The anode chamber may receive and store a reservoir of anodic material. Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface by the molten anodic material. Additionally, some additives may enhance the contact or wetting between the separator and the current collector, to ensure substantially uniform current flow throughout the separator.

Other additives may affect performance. Such performance additives may increase ionic conductivity, increase or decrease solubility of the charged cathodic species, reduce vapor pressure over the electrode, improve wetting of the solid electrolyte by the molten electrolyte, or prevent ripening of the cathode microdomains, to name several utilities. In one embodiment, the additive may be present in an amount that is less than about 5 mole percent compared to the total combined moles of alkali metal halide, aluminum halide and zinc halide.

The presence of a sulfur- or phosphorous-containing additive may be disposed in the cathodic material. The presence of sulfur or phosphorous in the cathode prevents recrystallization of salts and grain growth. For example, elemental sulfur, sodium sulfide, or triphenyl sulfide may be disposed in the cathode.

A suitable electrolyte may include a binary electrolyte or a ternary electrolyte. In a ternary electrolyte, alkali metal halide and zinc halide may be present in a determined amount relative to aluminum halide. The amount of the zinc halide present in the ternary electrolyte may be greater than about 20 mole percent relative to the amount of the aluminum halide.

In addition to the alkali metal halide and the zinc halide, the balance of the ternary electrolyte is aluminum halide. With regard to the halide portion, each of the halides of the ternary electrolyte may have a common halide, such as chloride. Alternately, the common halide may include bromide, iodide or fluoride. In one embodiment, the halide may include chloride and one or more additional halides. If a second or additional halide is present, then relative to the common halide the amount of additional halide may be greater than about 0.1 mole percent of the total halide concentration. In one embodiment, the additional halide amount is in range of from about 0.1 mole percent to about 0.5 mole percent, from about 0.5 mole percent to about 1 mole percent, from about 1 mole percent to about 5 mole percent, or from about 5 mole percent to about 10 mole percent.

The electrolyte has a nominal average melting point of about 150 degree Celsius. Suitable operating temperature for the electrochemical cell having the electrolyte may be greater than about 350 degrees Celsius. At lower operating temperature, below 350 degrees Celsius, the cell (ternary electrolyte) may have relatively higher resistance. The electrolyte may have an ionic resistivity that is greater than about 1.0 ohm-centimeter. In one embodiment, the electrolyte may have ionic resistivity that is in a range of from about 1.0 ohm-centimeter to about 1.5 ohm-centimeter, from about 1.5 ohm-centimeter to about 1.6 ohm-centimeter, from about 1.6 ohm-centimeter to about 1.7 ohm-centimeter, from about 1.7 ohm-centimeter to about 1.8 ohm-centimeter, from about 1.8 ohm-centimeter to about 1.9 ohm-centimeter, from about 1.9 ohm-centimeter to about 2.0 ohm-centimeter, or from about 2.0 ohm-centimeter to about 2.5 ohm-centimeter. Ions of interest include alkali metal ions.

The electrolyte may be disposed within the cathode chamber defined by the separator. The electrolyte may not infiltrate zinc ions from the zinc halide into the separator during use, where such infiltration is undesirable. That is, the electrolyte may be compatible with the cathodic material and the separator and thus may allow the rapid transport of ions from and to the cathodic material to and from the separator. The electrolyte may provide less ionic resistivity for alkali metal ions. Thus, use of the electrolyte may provide high power and high efficiency electrochemical cell operation.

As noted above, the separator is disposed within the volume of the housing. The separator may have a cross-sectional profile normal to the axis that is a circle, a triangle, a square, a cross, or a star. Alternatively, the separator can be about planar. A planar configuration (or with a slight dome) may be useful in a prismatic or button-type battery configuration, where the separator is domed or dimpled. Similarly, the separator can be flat or undulate.

The separator is an alkali metal ion conductor solid electrolyte that conducts alkali metal ions during use. Suitable materials for the separators may include an alkali-metal-beta'-alumina, alkali-metal-beta"-alumina, alkali-metal-beta'-gallate, or alkali-metal-beta"-gallate. In one embodiment, the separator includes a beta alumina. In one embodiment, a portion of the separator is alpha alumina and another portion of the separator is beta alumina. The alpha alumina may be relatively more amenable to bonding (e.g., compression bonding) than beta alumina, and may help with sealing and/or fabrication of the energy storage device.

The separator may be stabilized by the addition of small amounts of, but not limited to lithia, magnesia, zinc oxide, yttria or similar oxides. These stabilizers may be used alone or in combination with themselves or with other materials. The separator, sometimes referred to as beta alumina separator electrolyte (BASE) may include one or more dopant. Suitable dopants may include oxide of a transition metal selected from iron, nickel, copper, chromium, manganese, cobalt, or molybdenum. A separator having the dopants is referred to as beta" alumina separator electrolyte, and has higher sodium ion conductivity than beta alumina. Sodium ion conductivity of one form of beta" alumina separator electrolyte at 300 degrees Celsius is in a range of from about 0.2 ohm$^{-1}$ cm$^{-1}$ to about 0.4 ohm$^{-1}$ cm$^{-1}$.

The amount of the stabilizer to the beta" alumina can be greater than 0.5 weight percent. In one embodiment, the amount is in a range of from about 0.5 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, from about 5 weight percent to about 10 weight percent, from about 10 weight percent to about 15 weight percent, from about 15 weight percent to about 20 weight percent, or greater than about 20 weight percent based on the total weight of the beta" alumina material.

The separator can be a tubular container in one embodiment having at least one wall. The wall can have a thickness; and an ionic conductivity and the resistance across the wall may depend in part on the thickness. Suitable thickness can be less than 5 millimeters. In one embodiment, the thickness is in a range of from about 5 millimeters to about 4 millimeters, from about 4 millimeters to about 3 millimeters, from about 3 millimeters to about 2 millimeters, from about 2 millimeters to about 1.5 millimeters, from about 1.5 millimeters to about 1.25 millimeters, from about 1.25 millimeters to about 1.1 millimeters, from about 1.1 millimeters to about 1 millimeter, from about 1 millimeter to about 0.75 millimeters, from about 0.75 millimeters to about 0.6 millimeters, from about 0.6 millimeters to about 0.5 millimeters, from about 0.5 millimeters to about 0.4 millimeters, from about 0.4 millimeters to about 0.3 millimeters, or less than about 0.3 millimeters.

A cation facilitator material can be disposed on at least one surface of the separator, in one embodiment. The cation facilitator material may include, for example, selenium. At least one separator surface has a surface roughness RMS in a range of greater than about 10 nanometers. In one embodiment, the surface roughness (RMS) is in range of from about 10 nanometers to about 20 nanometers, from about 20 nanometers to about 30 nanometers, from about 30 nanometers to about 40 nanometers, from about 40 nanometers to about 50 nanometers, from about 50 nanometers to about 60 nanometers, from about 60 nanometers to about 70 nanometers, from about 70 nanometers to about 80 nanometers, from about 80 nanometers to about 90 nanometers, from about 90 nanometers to about 100 nanometers.

Optionally, one or more shim structures can be disposed with the volume. The shim structures support the separator within the volume of the housing. The shim structures can protect the separator from vibrations caused by motion of the cell during use and thus reduce or eliminate movement of the separator relative to the housing. If present, the shim structures may function as a current collector to the housing. Utilization of the shim structures as a current collector may be useful if the molten anode level rises and falls during charge and discharge. The shim structures may provide a thin gap adjacent to the separator to facilitate wicking of a thin layer of molten anodic material against a surface of the separator. This wicking may be independent of the state of charge of the battery, and independent of the head height of anodic material.

The separator can seal to an inner surface of the housing by a sealing structure. The sealing structure can be of a glassy composition. The sealing structure is operable to maintain a seal between the contents and the environment at a temperature greater than about 100 degrees Celsius. In one embodiment, the operating temperature range is from about 100 degrees Celsius to about 200 degrees Celsius, from about 200 degrees Celsius to about 300 degrees Celsius, from about 300 degrees Celsius to 400 degrees Celsius, from about 400 degrees Celsius to about 500 degrees Celsius, from about 500 degrees Celsius to about 600 degrees Celsius.

Suitable glassy sealing compositions may include, but are not limited to phosphates, silicates, borates, germinates, vanadates, zirconates, arsenates, and their various forms, for example, borosilicates, alumino silicate, calcium silicate, binary alkali silicates, alkali borates, or a combination of two or more thereof. Alternatively, the end portions of the separator may include alpha alumina. The alpha alumina can be bonded directly to the lid that encloses the cathode chamber. Suitable bonding methods may include thermal compression bonding, diffusion bonding, or thin film metallizing, each of these may be used in conjunction with welding or brazing techniques.

The separator can be formed as a toughened ceramic, and can be formed with various modifiers that affect physical strength, vibration/shock resistance, ionic conductivity/resistance, and copper ion infiltration. To reduce a pressure differential across the separator, the negative pressure generally caused on the cathode side by the migration of ions to the anode may be balanced by reducing the initial pressure on the anode side to less than ambient. The anode side may be sealed under vacuum, or a vacuum may be formed after sealing by reacting a consumable gas (oxygen) in the anode chamber with the incoming ions (e.g., sodium to solid sodium oxide) during initial usage.

The energy storage device may have a plurality of current collectors including anode current collectors and cathode current collectors. The anode current collector is in electrical communication with the anode chamber and the cathode current collector is in electrical communication with the contents of the cathode chamber. Suitable materials for the anode current collector may include W, Ti, Ni, Cu, Mo or combinations of two or more thereof. Other suitable materials for the anode current collector may include carbon. The cathode current collector may be a wire, paddle or mesh formed from Pt, Pd, Au, Ni, Cu, C, or Ti. The current collector may be plated or clad. In one embodiment, the current collector is free of iron.

The plurality of current collectors can have thickness greater than 1 millimeter (mm). In one embodiment, the thickness is in a range of from about 1 millimeter to about 10 millimeters, from about 10 millimeters to about 20 millimeters, from about 20 millimeters to about 30 millimeters, from about 30 millimeters to about 40 millimeters, or from about 40 millimeters to about to about 50 millimeters. Cladding on the current collector, if present, may coat the current collector to a thickness greater than about 1 µm. In one embodiment, the cladding thickness is in a range of from about 1 micrometer (µm) to about 10 µm, from about 10 µm to about 20 µm, from about 20 µm to about 30 µm, from about 30 µm to about 40 µm, or from about 40 µm to about to about 50 µm.

The device may be an electrochemical cell, which be assembled in the discharged state. Applying a voltage between the anode and the cathode of the electrochemical cell may charge the electrochemical cell. In one embodiment, sodium chloride in the cathode dissolves to form sodium ions and chloride ions during charging. Sodium ions, under the influence of applied electrical potential, conduct through the separator and combine with electrons from the external circuit to form the sodium electrode and chloride ions react with the cathodic material to form metal chloride and donate electrons back to external circuit. During discharge, sodium ions conduct back through the separator reversing the reaction, and generating electrons. The cell reaction is as follows:

$$n\text{NaCl} + M \leftrightarrow M\text{Cl}_n + n\text{Na}^+ + ne^-$$

The electrochemical cell includes the separator having active area A; and the cell is capable of repeatedly storing and discharging a quantity of charge Q, the resistance between the two terminals is R; and through a full isothermal charge or discharge of Q, a ratio RA/Q remains in a range of from about $1.5\times10^{-6}$ ohm-m$^2$/amp-hr to about $9.2\times10^{-6}$ ohm-m$^2$/amp-hr. In one embodiment, the cell can have a resistance differential that is less than 10 percent, where the resistance is expressed in Ohms, on discharge, when comparing at about 0 amp-hours relative to about 35 amp-hours, and at a temperature that is greater than about 350 degrees Celsius.

A plurality of the electrochemical cells can be organized into an energy storage system. Multiple cells can be connected in series or parallel. For convenience, a group of coupled cells may be referred to as a module or pack. The ratings for the power and energy of the module may depend on such factors as the number of cells in the module. Other factors may be based on end-use application specific criteria.

Various embodiments of the energy storage system can store an amount of energy that is in a range of from about 0.1 kiloWatt hours (kWh) to about 100 kWh. One embodiment of the energy storage system has an energy-by-weight ratio of greater than 100 Watt-Hours/kilogram, and/or an energy-by-volume ratio of greater than 160 Watt-Hours/liter. Another embodiment of the energy storage system has a specific power rating of greater than 150 Watts/kilogram.

Suitable energy storage system may have an application specific Power to Energy ratio of less than 10 to 1 hour$^{-1}$. In one embodiment, the specific power to energy ratio is in range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

In one embodiment of the energy storage system, a controller communicates with the plurality of the cells. The controller can distribute an electrical load to select cells in a cell module in response to feedback signals indicating states for each of the cells in the cell module. The controller can perform a re-warm method in which a series of heating elements are activated in a sequence to melt a frozen portion of the energy storage device in a determined manner. In another embodiment, the controller may distribute an electrical load to select cathodic materials at determined locations within individual cells.

The controller can determine a state of charge in the energy storage device based on the chemistry of the cell. A suitable state of charge determination can be made by associating $ZnCl_2$ concentration in the energy storage device with an open circuit voltage; associating $ZnCl_2$ concentration voltage with state of charge; measuring the open circuit voltage; and determining the state of charge based on the open circuit voltage measurement, and a corresponding $ZnCl_2$ concentration for the measured open circuit voltage, and the state of charge for the corresponding $ZnCl_2$ concentration. This is possible owing to the relationship between open circuit voltage and $ZnCl_2$ concentration—which, in turn, relates to the state of charge.

If present, a heat management device maintains the temperature of the energy storage system. The heat management device can warm the energy storage system if too cold, and can cool the energy storage system if too warm. The heat management system includes a thaw profile that can maintain a minimal heat level in the anode and cathode chambers to avoid a freeze of cell reagents.

Another embodiment of the invention provides an energy management system that includes a second energy storage device that differs from the energy storage device. This duel energy storage device system can address the ratio of power to energy in that a first energy storage device can be optimized for efficient energy storage, and a second energy storage device can be optimized for power delivery. The control system can draw from either energy storage device as needed, and charge back either energy storage device that needs such a charge.

Suitable second energy storage devices, for the power piece, include a primary battery, a secondary battery, a fuel cell, or an ultracapacitor. A suitable secondary battery may be a lithium battery, lithium ion battery, lithium polymer battery, or a nickel metal hydride battery.

EXAMPLES

The following examples illustrate methods and embodiments in accordance with the invention, and as such do not limit the claims. Unless specified otherwise, all ingredients are commercially available from such common chemical suppliers as Alpha Aesar, Inc. (Ward Hill, Mass.), Spectrum Chemical Mfg. Corp. (Gardena, Calif.), and the like.

Example 1

Compression Molding a Cathode

The solid components of a cathodic material include zinc (Alfa Aesar Item #00424, −100 mesh, 99.9% metals basis), brass (Alfa Aesar Item #43213, −325 mesh, 99.9% metals basis), and sodium chloride (Alfa Aesar Item #87605, 99.99%). To increase the surface area for improved mass transfer, the sodium chloride is milled to −200 mesh in a laboratory mill in a dry glove box.

Ammonium bicarbonate (Sigma-Aldrich Item #A6141, 99.0% reagent grade) is mixed with the cathode precursor solids as a pore former. After 1 min of mechanical milling in an inert-atmosphere glove box, the ammonium bicarbonate powder is sieved, and the +170 mesh powder is retained for use in the cathode preparation. The presence and amount of ammonium bicarbonate influences cathode performance. Addition of 10-20 w/o ammonium bicarbonate (13-30 v/o), results in significantly higher molding pressures to achieve a determined packing density. Beneficially, this results in moldings that have relatively higher mechanical integrity.

Pressing of the cathodic material powders is done in a 2 centimeter diameter, three-part, matched-die press tool. The powders are mixed in an inert-atmosphere glove box, and then loaded into the die just prior to molding. The powders are tamped down using a brass rod to create an even and uniform layer in a standard die. The pusher rod is marked beforehand to a mold height of 0.5 cm, the desired height of the molded cathode.

The die tool is loaded into a hydraulic press. Press force is manually increased until the design mold height is achieved, with maximum forces ranging from 15-100 kiloNewtons, depending on the pore-former weight fraction. After pressing, the pore former is removed from the molded disc in a vacuum oven at 150 degrees Celsius for one hour. Ammonium bicarbonate decomposes to ammonia, carbon dioxide, and water at 30 degrees Celsius to 60 degrees Celsius. The molded disc is cooled. The molded disc is transferred to an inert-atmosphere glove box to minimize moisture gain. The combination of compression molding and removal of pore former results in a molding of the desired porosity, in this case about 47 percent of theoretical.

Example 2

Producing an Electrolyte

Sodium chloride and aluminum chloride are mixed and melted together to produce sodium tetrachloro aluminate (NaAlCl$_4$). Aluminum chloride is volatile when melted, so mixing and melting of the binary salt is done as a separate step before electrochemical cell fabrication.

Preparation of the binary salt is done in a nitrogen purge box to keep the materials as dry as possible. To produce a 750 gram batch of NaCl-rich (basic) sodium tetrachloro aluminate, 500 g of aluminum chloride (Sigma-Aldrich Item #294713, 99.99% reagent grade) and 250 g of sodium chloride (Sigma-Aldrich Item #204439, 99.999% reagent grade) are mixed in a 500-mL reaction vessel. The reaction vessel is sealed with a clamped lid. The lid is equipped with a gas outlet connected to a mineral oil bubbler to relieve any pressure.

The reaction vessel containing the dry powders is heated to 300 degrees Celsius, which is above the melting point of the binary salt mixture. Once melted, 5-10 grams of aluminum powder (Alfa Aesar Item #42919, −100+325 mesh, 99.97% metals basis) is introduced to the molten salt. The aluminum powder, which oxidizes readily, acts to scavenge metallic impurities present in the raw materials as cationic species.

Once melted, with impurities precipitated out, the sodium tetrachloro aluminate is filtered to remove the aluminum powder and the precipitates. The molten salt is pipetted onto a heated (from about 200 to about 300 degrees Celsius) glass frit (25-μm minimum pore size). The filtered molten salt is collected on aluminum foil. Once the filtered molten salt has solidified, it is manually chipped into smaller pieces, then milled in a dedicated, laboratory-scale, grinding mill for 60 seconds. The sodium tetrachloro aluminate powder is stored in a glove box for use in cell fabrication as a binary electrolyte. Where needed, a portion of the sodium tetrachloro aluminate powder is combined with zinc chloride salt and sodium chloride to produce a ternary electrolyte, which is stored in a glove box for use in cell fabrication.

Example 3

Preparation of Electrochemical Cells for Samples 1-4

Mixtures of sodium chloride, aluminum chloride, and zinc chloride are prepared as the electrolyte precursor material. A series of samples are formed in which the mole ratio, respectively, of sodium chloride, aluminum chloride and zinc chloride in the samples are 1) 4:1:0.2; 2) 4:1:0.5; 3) 4:1:1; and 4) 4:1:2.

Four separator tubes, cylindrical in shape, are produced according to known methods or are commercially obtained. Each tube is ceramic sodium conductive beta"alumina. The cylinder dimensions are 228 mm length, 36 mm internal diameter, and 38 mm outside diameter. Each ceramic separator tube is glass sealed to an alpha alumina collar to form an assembly. Each assembly is placed in a stainless steel can that is the housing to form an electrochemical cell. The can size is about 38 mm×38 mm×230 mm.

The cathodic material includes zinc powder and alpha-brass powder. The cathodic material is disposed in the volume of the housing, and within the separator tube, and functions as the working cathode. The brass functions as a current collector and is in electrical communication with leads allowing that to happen. The housing functions as a second current collector.

The temperature of each of the four formed electrochemical cells is increased at a controlled rate (5 degrees Celsius per minute) through the melt temperature of the ternary electrolyte precursors, and up to an operating temperature of 400 degrees Celsius. The ternary electrolyte forms in situ. Each current collector has external wire ends. The external wire ends are connected to a computer-interfaced galvanostat (PARSTAT 2273 available from AMETEK Princeton Applied Research (Oak Ridge, Tenn.)) and constant current data are measured.

Results show acceptable stability of the separator, a low electrical resistance rise. That is, the cells perform desirably. The open circuit voltage measured is variable based on the amount or concentration of the zinc chloride. A graph can be constructed that relates the measured open circuit voltage to zinc chloride concentration, and the zinc chloride concentration (or activity) relates to the state of charge.

Characterization of the cathodic material after use with back-scatter electron microscopy and wavelength dispersive X-ray analysis indicates that the brass alloy has undergone a partial transformation, at least on the surface, from alpha brass to gamma brass.

Example 4

Preparation of Electrochemical Cells for Samples 5-8

Samples 5-8 are created and formed in corresponding test cells, the molar ratios of electrolyte in Samples 5-8 are correspondingly the same as the electrolyte in Samples 1-4 as described in Example 3. The difference being that instead of the cathodic material being zinc and brass, the cathodic material is a dry mix of granulated zinc metal, copper metal, and sodium chloride. A rod shaped molybdenum-based current collector is disposed in the ceramic separator. The dry granulated mix is dry mixed with the electrolyte mix to form four fill batches. Each of the four fill batches is added into a ceramic separator around the current collector.

The temperature of each of the four formed electrochemical cells is increased at a controlled rate (5 degrees Celsius per minute) through the melt temperature of the ternary electrolyte precursors, and up to an operating temperature of 400 degrees Celsius. The ternary electrolyte forms in situ. Each current collector has external wire ends. The external wire ends are connected to a computer-interfaced galvanostat (PARSTAT 2273 available from AMETEK Princeton Applied Research (Oak Ridge, Tenn.) and constant current data are measured.

Results show acceptable stability of the separator, a low electrical resistance rise. That is, the cells perform desirably. The open circuit voltage measured is variable based on the amount or concentration of the zinc chloride. A graph can be constructed that relates the measured open circuit voltage to zinc chloride concentration, and the zinc chloride concentration (or activity) relates to the state of charge.

Observation of the cathodic material after electrochemical cycling indicates that the zinc and copper powders loaded have formed a brass alloy. The brass is zinc rich proximate the separator, and is copper rich proximate the current collector.

Example 5

Preparation of Electrochemical Cells for Samples 9-10

Before a cathode disc is loaded into the test cell, the disc is vacuum impregnated with molten sodium tetrachloroaluminate by submerging the disc in a heated flask of the molten salt at 300 degrees Celsius, and then pumping a rough vacuum for one hour.

The hot disk is transferred to the separator (β"-Alumina Solid Electrolyte, sometimes referred to as BASE), a 2-cm inner diameter, 1.5-mm wall thickness, 4-cm tall, flat-bottom tube (Ionotec Ltd, Cheshire, England). A quantity of additional sodium tetrachloroaluminate is added to the cathode chamber to ensure the cathode is fully enveloped with molten-salt electrolyte. The cathode current collector, a 0.63-cm diameter brass rod with a 1.8-cm diameter brass disc press fit onto the end of the rod, rests on top of the molded disc. The cathode chamber is covered by a machined ceramic cap that fits around the current collector and inside the top of the separator. The cap minimizes evaporative losses from the molten electrolyte and minimizes crossover of sodium vapor from the anode chamber.

The cathode/separator assembly is placed in a stainless-steel crucible containing 1-2 grams of metallic sodium. The crucible serves as the anode chamber; two 2-mm stainless-steel wires spot-welded to the crucible serve as anode current collectors.

The completed cell is heated to 400 degrees Celsius. This operating point is above the melting point of $Na_2ZnCl_4$, but below the melting point of metallic zinc, which may be about 418 degrees Celsius.

The contents of two cells built in this cell design are given in Table 1. Sample 9 is designed to utilize zinc present in the brass support material during charging, while Sample 10 utilizes only metallic zinc added to the brass support. The electrolyte surface areas in Table 1 correspond to the area in contact with the molded cathode. The wetted anode area is larger.

TABLE 1

Ingredient list for Samples 9-10.

|  | Sample 9 | Sample 10 |
| --- | --- | --- |
| Brass | 2.32 g | 1.42 g |
| Zinc | 0.28 g | 0.63 g |
| Sodium Chloride | 1.12 g | 1.68 g |
| Ammonium Bicarbonate (before baking) | 0.41 g | 0.41 g |
| Sodium tetrachloro aluminate | 2.51 g | 2.51 g |
| Sodium | 2 g | 2 g |
| Separator surface area | 6.28 cm$^2$ | 5.97 cm$^2$ |

Testing of the Sample 9-10 cells is performed on a 10-amp, 10-V, 4-channel, Princeton Applied Research (PAR) VMP3 model potentiostat. Charging and discharging of the cells is performed at 0.01 amp/cm$^2$ to 0.3 amp/cm$^2$ of separator (ceramic electrolyte) surface area. Cells are cycled under constant-current control with limits on maximum (charging) and minimum (discharging) cell potential, followed by further electrolysis at constant cell potential. Each half-cycle is ended when the design charge capacity is reached. The temperature at the outside of the anode is 400 degrees Celsius.

Sample 9 illustrates the participation of metallic and brass-bound zinc in oxidation. Cycling protocol includes the following. Four charge and discharge cycles are performed for Sample 9. In these cycles, the cell is charged at 0.06 amp under constant-current control to a voltage of 2.6 V versus sodium. At 2.6 V, the cell is held at constant voltage until the design charge capacity of 0.5 amp-hr is reached. The cell is discharged at negative 0.06 amp under constant-current control to a voltage of 1.7 V. At 1.7 V, the cell is held at constant voltage until the designed capacity is reached. During charging and discharging, the constant-current steps are periodically paused for 300 seconds to measure the open-circuit potential of the cell.

Figure 1:
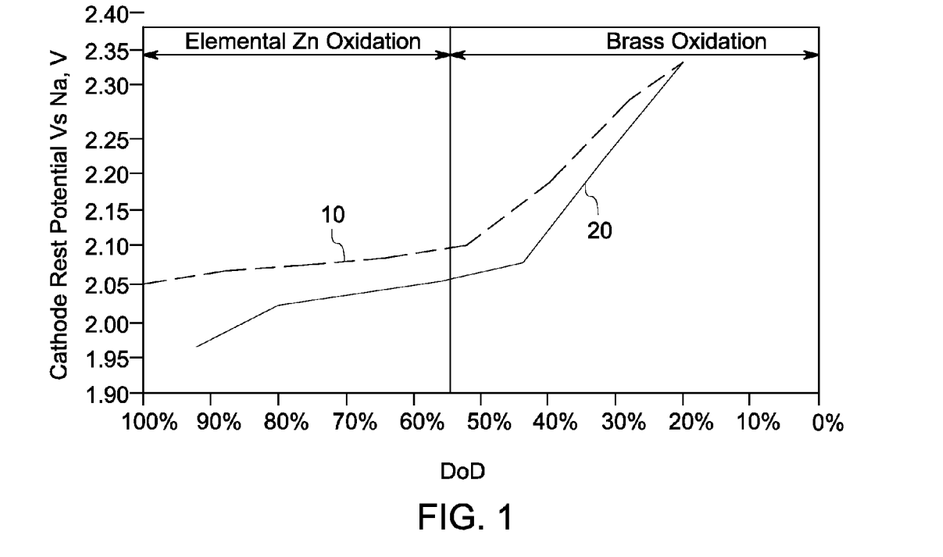
FIG. 1 is a graph showing potentials at differing depths of discharge.

Open-circuit potential, measured in the rest periods, is shown in FIG. 1. $U_0$ is seen to rise with decreasing DoD. The $U_0$ curves are somewhat different during charging, $U_{OC}$, and discharging, $U_{OD}$, with the discharging curve at slightly lower potential. These differences are attributed to differences in the cathode surface composition during charging (Cu-rich) and discharging (Zn-rich), as well as to lack of complete equilibration in the electrolyte during the 300 second rest period.

Enough metallic zinc is included in the initial composition to support 0.23 amp-hr of charging (54% DoD). Below 54% DoD, brassbound zinc must participate in oxidation, assuming that all metallic zinc is oxidized first. Charging is represented by a line indicated by the reference number 10, and discharge by a line indicated by reference number 20. Brassbound zinc may oxidize at a potential that is intermediate between those potentials for zinc and copper. Brassbound zinc may preferentially oxidize before the copper, which may keep the copper from becoming a mobile ionic species that may threaten the integrity of the separator. The standard reduction potential of $Cu^{++}$ is 0.6 V higher than that for $Zn^{++}$. During discharge, zinc precipitates onto the brass support, and the electrode surface is expected to be richer in zinc, than at the same DoD during charging.

Figure 2:
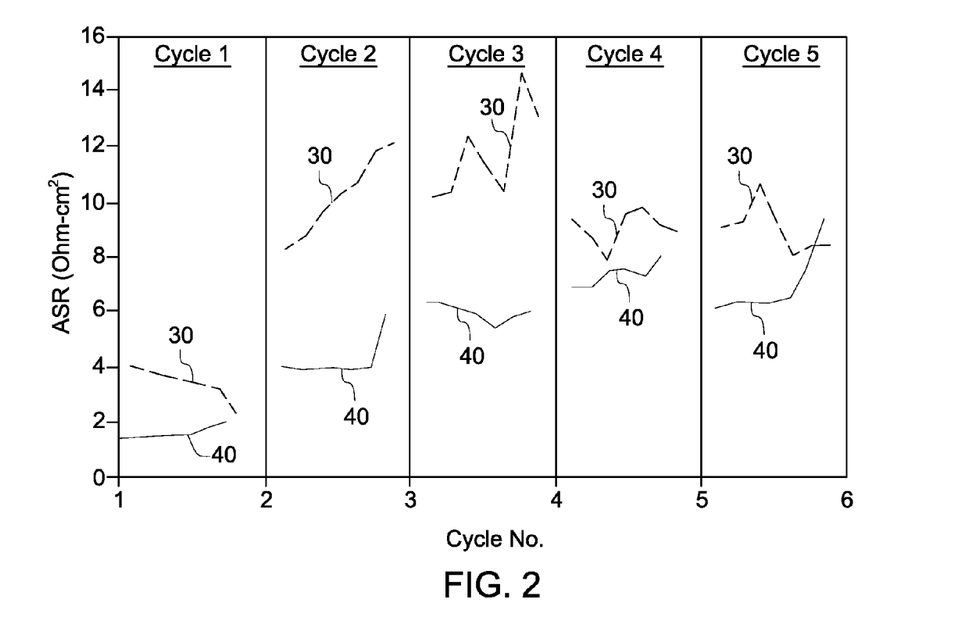
FIG. 2 is a graph of a series of cycles showing electrolyte area specific resistances for a material according to an embodiment of the invention.

With regard to charging and discharging resistances, current interrupts are used to calculate the resistance of the cell. The resistance of the cell is calculated by:

$$Rj = \frac{U - U_{0j15}}{I}$$

where U and I are the charging potential and current, measured immediately prior to an interrupt, and $U_{0j15}$ is the potential measured 15 seconds after the current interrupt. 15 seconds is long enough to capture purely ohmic resistance and short enough, so that re-equilibration processes involving long-range mass transport are not included in the calculation. j=C for charging; and, =D for discharging FIG. 2 shows the electrolyte-area-specific resistances, $\rho^C$ and $\rho^D$, for Sample 9 (cycles one through five). For each cycle dataset, the left side of the panel corresponds to 100% DoD, and the right side to 0% DoD.

In each cycle, the discharging resistance (30) is higher than the charging resistance (40). The solids volume fraction in the cathode increases with DoD, due possibly to the deposition of NaCl. Both charging and discharging in the cathode are expected to initiate at the beta" alumina interface and move inward as electrolysis proceeds. In the case of charging, porosity is high in the wake of the reaction front, and the effective ionic conductivity is high. In the case of discharging, porosity is low in the wake of the reaction front, as is the effective ionic conductivity.

Also of note is the increase in charging resistance, cycle over cycle, increasing nearly 300% in only five cycles. While the trend in discharging resistance is less clear, the resistance by cycle five is higher than in cycle one (roughly 200% increase). At 0% DoD, 97% of the NaCl has been consumed by the oxidation reaction. In this state, the molten salt composition is acidic in the sense that the Group 12 and 13 metal chlorides, $ZnCl_2$ and $AlCl_3$, chloride-accepting Lewis acids, are not balanced by a full complement of alkali NaCl, a chloride-donor Lewis base: one NaCl to each $AlCl_3$ and two NaCl to each $ZnCl_2$. Under acidic conditions, there may be reduced conductivity in the beta" alumina. In the absence of balancing NaCl, the vapor pressure over the molten electrolyte may increase, which can lead to evaporation of the electrolyte. Both of these phenomena may result in increased cell resistance.

Figure 3:
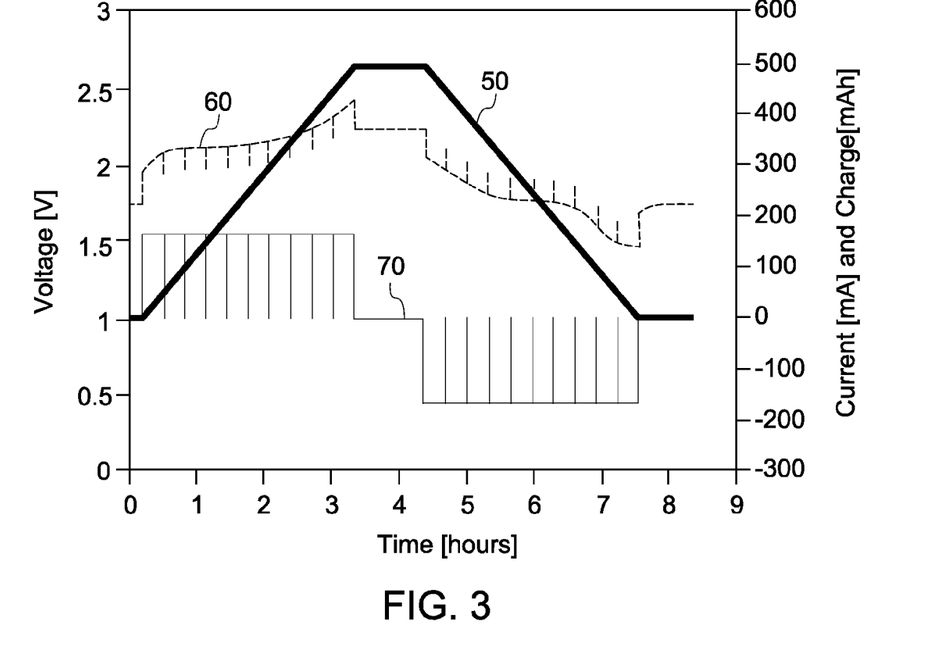
FIG. 3 is a graph of charge and discharge cycle for a material according to an embodiment of the invention.

One charging/discharging cycle of Sample 10 is shown in FIG. 3. As shown by the charge curve (50), the capacity of Sample 10 is equivalent to that of Sample 9, which is 0.5 amp-hr. In this cycle, the Sample 10 cell is charged at 0.165 amp in current control (60) until the design charge capacity of 0.5 Ah is reached. After a one hour rest, the Sample 10 cell is then discharged at negative 0.165 amp in current control (70), until the design capacity is reached. In both charge and discharge, the constant current steps are periodically interrupted for 300 seconds to measure the open-circuit potentials, $U_{OC}$ and $U_{OD}$, of the cell.

Figure 4:
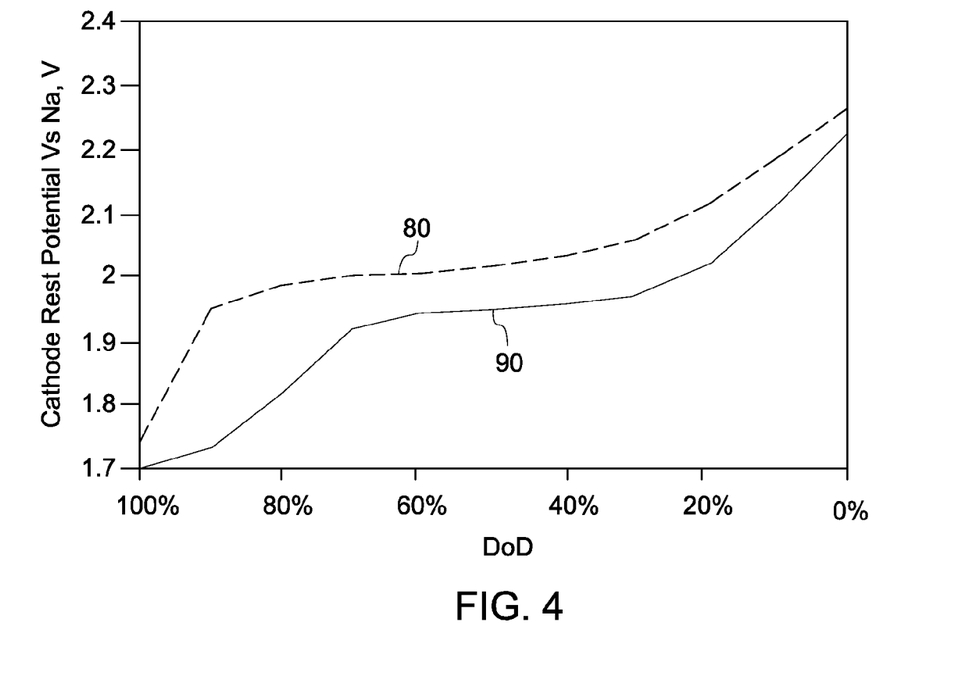
FIG. 4 is a graph showing potentials at differing depths of discharge.

$U_{OC}$ (80) and $U_{OD}$ (90) measured during the periodic rests are shown in FIG. 4. Compared to Sample 9, the potentials at 0% depth of discharge (DoD) and 100% DoD in Sample 10 are lower. From FIG. 4, $<U_{OD}>Q$ (state of charge average of $U_{OD}$) is calculated to be 1.941 V over 0.5 amp-hr of discharge. The maximum discharge energy, is WDmax=(1.941 V)(0.5 amp-hr)=0.97 W-hr for Sample 10. The cathode volume is Vcat=1.57 cm3. The maximum discharge energy density of the zinc cathode in Sample 10 is WDmax/Vcat=0.62 W-hr/cm3.

Figure 5:
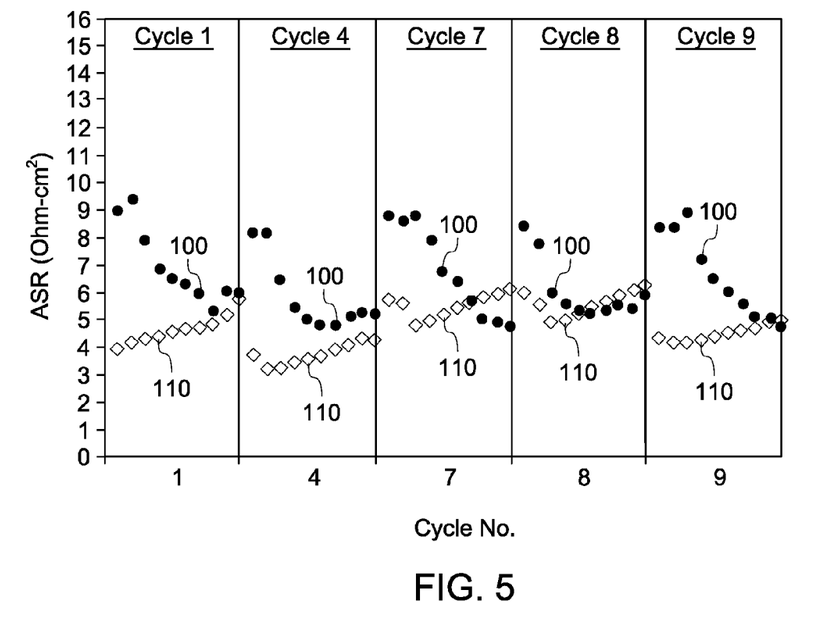
FIG. 5 is a graph of a series of cycles showing electrolyte area specific resistances for a material according to an embodiment of the invention.

FIG. 5 shows $\rho^C$ and $\rho^D$ for cycles one, four, seven, eight and nine, for Sample 10, similar to FIG. 2. In each panel, DoD varies from 100% to 0% going left to right. In the case of Sample 10, little change is seen from cycle to cycle. In most cycles the discharge resistance (100) is higher than the charge resistance (110), although the two are much closer than in Sample 9.

The zinc cathode can yield up to 100% utilization of metallic zinc. As shown in FIGS. 2 and 5, the area-specific resistances, $\rho^C$ and $\rho^D$, of the zinc cells demonstrate relatively flat responses over the DoD range. The combination of lower open-circuit potential, and higher maximum potential translates to a relatively higher maximum charging rate. In some applications, such as a diesel electric locomotive with regenerative braking, the maximum charging rate can be a significant determinant of overall battery performance, where only short bursts of regenerative energy are available for charging the battery system.

With a zinc-based cathode there is a DoD-dependent open-circuit potential, as shown in FIGS. 1 and 4. The zinc cathode exhibits constantly changing, but predictable, open-circuit voltage potential versus the depth or state of charge. This can indicate the state of charge or the DoD if the associations are provided for the specific cell used. It is therefore possible to predict or determine state of charge without cumulative charge tracking and periodic resets.

Figure 6:
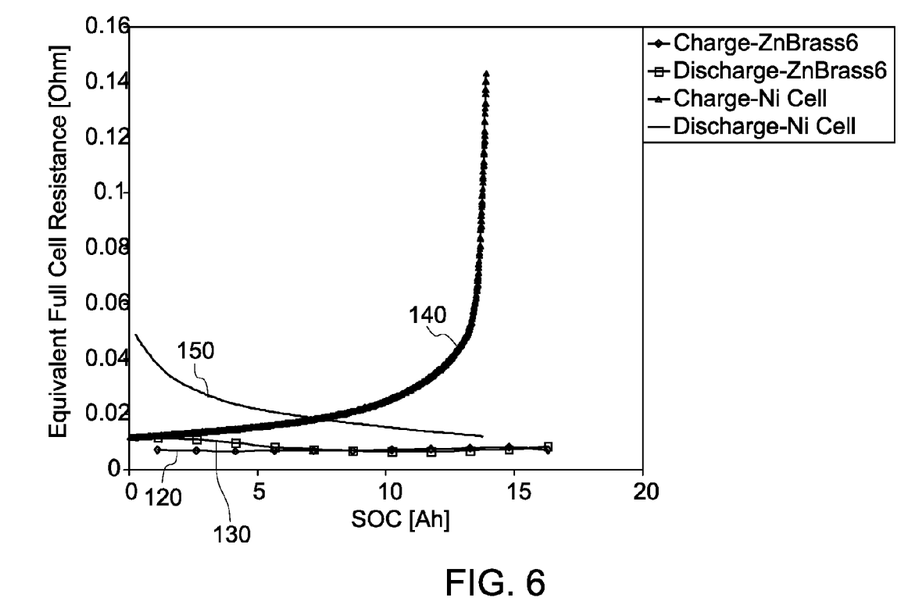
FIG. 6 is a graph showing cell resistance during charge and discharge according to an embodiment of the invention.

FIG. 6 shows cell resistance for zinc cell and nickel cell during charge and discharge cycles. The resistance curves for zinc cell during charge (120) and discharge (130) are relatively flat. With respect to the zinc cell, the resistance level of the nickel cell for charge (140) and discharge (150) are relatively high for entire state of charge. High cell resistance of nickel cell during charge of the cell is due to an insulating film formation on cathode. In contrast to the nickel cell, the zinc cell is free of insulating film formation during cell operation.

Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity can not occur—this distinction is captured by the terms "may" and "may be".

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

The invention claimed is:

1. A composition, comprising:
  a cathodic material comprising a support structure comprising:
    a copper and zinc, and having less than 1 weight percent of aluminum, tin, or aluminum and tin, wherein the zinc and the copper form a brass alloy, and the form of the alloy is porous foam that is open-cell or reticulated, wherein the pores have an average pore size distribution that is bimodal with a first mode that is about 100 micrometers, and a second mode that is about 10 micrometers.

2. The composition as defined in claim 1, wherein at least one of the zinc or the copper is in the form of powder, fiber, foam, or foil.

3. The composition as defined in claim 1, wherein substantially all of the zinc in the cathodic material is alloyed with the copper.

4. The composition as defined in claim 1, wherein the pores include electrochemically etched pores that constitute about 10 percent of the total pore volume.

5. The composition as defined in claim 1, wherein the brass includes an amount of gamma-brass that forms a layer on the surface of the support structure.

6. The composition as defined in claim 5, wherein the layer of gamma-brass on the surface of support structure has a thickness of about less than 10 micrometer.

7. The composition as defined in claim 5, wherein the layer of gamma-brass on the surface of support structure has a thickness of about less than 5 micrometer.

8. The composition as defined in claim 5, wherein the layer of gamma-brass on the surface of support structure has a thickness of about less than 1 micrometer.

9. The composition as defined in claim 1, wherein the support structure in an electrochemical reaction is not readily oxidizable by the electrochemical reaction at a determined maximum cell potential that is less than the copper oxidation potential but greater than the zinc oxidation potential.

10. The composition as defined in claim 1, wherein the zinc is present in sufficient quantities to galvanically maintain the copper in a non-ionic form or a metallic form, and thereby to reduce or prevent migration of copper into a separator in communication therewith.

11. The composition as defined in claim 1, wherein the amount of aluminum or tin, or the combined amount of aluminum and tin, is in a range of from about 0.01 percent to about 0.1 percent based on the weight of the combination of copper and zinc.

12. The composition as defined in claim 1, wherein the amount of aluminum is zero.

13. The composition as defined in claim 1, wherein the amount of tin is zero.

14. The composition as defined in claim 1, wherein the combined amount of aluminum and tin is zero.

15. A composition comprising;
a cathodic material, wherein the cathodic material is a reaction product of a brass support structure and zinc, wherein the brass support structure is porous foam that is open-cell or reticulated, wherein the pores have an average pore size distribution that is bimodal with a first mode that is about 100 micrometers, and a second mode that is about 10 micrometers.

16. The composition as defined in claim 15, wherein brass support structure comprises alpha brass and the reaction product comprises gamma brass.

17. An energy storage device comprising a composition defined as in claim 1.

* * * * *